(12) United States Patent
Or-Chen et al.

(10) Patent No.: US 11,485,127 B2
(45) Date of Patent: Nov. 1, 2022

(54) PRINTED RIGID PLASTIC SUBSTRATES

(71) Applicant: HP INDIGO B.V., Amstelveen (NL)

(72) Inventors: Dafna Or-Chen, Nes Ziona (IL); Keren Nadav, Ness Ziona (IL); Dani Tulchinski, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 126 days.

(21) Appl. No.: 16/603,468

(22) PCT Filed: Dec. 19, 2017

(86) PCT No.: PCT/EP2017/067230
§ 371 (c)(1),
(2) Date: Oct. 7, 2019

(87) PCT Pub. No.: WO2018/118870
PCT Pub. Date: Jun. 28, 2018

(65) Prior Publication Data
US 2021/0107271 A1    Apr. 15, 2021

(51) Int. Cl.
*B32B 38/00* (2006.01)
*B32B 7/12* (2006.01)
(Continued)

(52) U.S. Cl.
CPC .............. *B32B 38/145* (2013.01); *B32B 7/12* (2013.01); *B32B 27/08* (2013.01); *B32B 27/304* (2013.01); *B32B 27/306* (2013.01); *B32B 27/36* (2013.01); *B32B 27/365* (2013.01); *B32B 37/12* (2013.01); *B32B 37/144* (2013.01);
(Continued)

(58) Field of Classification Search
CPC .. B32B 38/145; B32B 2327/06; G03G 13/10; G03G 13/20
See application file for complete search history.

(56) References Cited

U.S. PATENT DOCUMENTS

| 4,133,926 A | 1/1979 | Vorrier et al. |
| 7,014,974 B1 | 3/2006 | Almog et al. |

(Continued)

FOREIGN PATENT DOCUMENTS

| EP | 0954446 B1 | 12/2002 |
| EP | 1769042 B1 | 3/2011 |

(Continued)

*Primary Examiner* — Carson Gross
(74) *Attorney, Agent, or Firm* — Dicke Billig & Czaja PLLC

(57) ABSTRACT

A process for preparing a printed rigid plastic substrate is described, the process comprising: providing a rigid plastic substrate comprising a primer on a surface of the rigid plastic substrate, the primer comprising a primer resin; printing a liquid electrophotographic ink composition comprising a thermoplastic resin onto the primer on the surface of the rigid plastic substrate; depositing a cross-linking composition comprising a cross-linker onto the printed electrophotographic ink composition disposed on the primer; and laminating the rigid plastic substrate with a flexible film such that the ink composition and the cross-linker are disposed between the rigid substrate and the flexible film and wherein the lamination of the rigid substrate with the flexible film causes cross-linking of the thermoplastic resin of the ink composition and of the primer resin.

19 Claims, 2 Drawing Sheets

(51) Int. Cl.
| | |
|---|---|
| *B32B 27/08* | (2006.01) |
| *B32B 27/30* | (2006.01) |
| *B32B 27/36* | (2006.01) |
| *B32B 37/12* | (2006.01) |
| *C09J 5/00* | (2006.01) |
| *B32B 37/14* | (2006.01) |
| *B41M 7/00* | (2006.01) |
| *B41M 5/00* | (2006.01) |
| *G03G 11/00* | (2006.01) |
| *G03G 8/00* | (2006.01) |
| *G03G 13/10* | (2006.01) |
| *G03G 13/20* | (2006.01) |
| *G03G 9/12* | (2006.01) |
| *G03G 9/13* | (2006.01) |
| *B32B 37/18* | (2006.01) |
| *G03G 7/00* | (2006.01) |

(52) U.S. Cl.
CPC ........ *B41M 5/0017* (2013.01); *B41M 7/0018* (2013.01); *B41M 7/0027* (2013.01); *C09J 5/00* (2013.01); *G03G 8/00* (2013.01); *G03G 11/00* (2013.01); *G03G 13/10* (2013.01); *G03G 13/20* (2013.01); *B32B 37/182* (2013.01); *B32B 2327/06* (2013.01); *C09J 2433/00* (2013.01); *C09J 2475/00* (2013.01); *C09J 2477/00* (2013.01); *G03G 7/008* (2013.01); *G03G 9/122* (2013.01); *G03G 9/131* (2013.01); *G03G 2215/0629* (2013.01)

(56) References Cited

U.S. PATENT DOCUMENTS

| | | | |
|---|---|---|---|
| 7,744,001 B2 * | 6/2010 | LaBrec | B42D 25/23 235/487 |
| 2003/0021961 A1 | 1/2003 | Ylitalo et al. | |
| 2004/0197572 A1 | 10/2004 | Bell | |
| 2005/0245651 A1 * | 11/2005 | Cooper | G03G 7/0033 524/270 |
| 2013/0140806 A1 | 6/2013 | Wilkinson | |
| 2013/0224395 A1 | 8/2013 | Regnier | |
| 2014/0370252 A1 | 12/2014 | Regnier | |
| 2015/0064421 A1 | 3/2015 | Dohring | |
| 2016/0121622 A1 * | 5/2016 | Mor | G03G 8/00 428/195.1 |
| 2018/0163086 A1 * | 6/2018 | Crombie | C09D 11/107 |

FOREIGN PATENT DOCUMENTS

| | | |
|---|---|---|
| WO | WO-0016167 | 3/2000 |
| WO | WO-2008057495 A2 | 5/2008 |
| WO | WO-2017067610 | 4/2017 |
| WO | WO-2017067611 A1 | 4/2017 |

\* cited by examiner

PRINTED RIGID PLASTIC SUBSTRATES

CROSS-REFERENCE TO RELATED APPLICATIONS

This Utility Patent Application is a U.S. National Stage filing under 35 U.S.C. § 371 of PCT/EP2017/067230, filed Jul. 10, 2017, incorporated by reference herein.

BACKGROUND

Printed rigid plastic substrates may be used in many types of identification cards and documents, such as driving licenses, national or government identification cards, bank cards, credit cards, controlled access cards and smart cards, the printed images used, for example, to provide identity information or corporate information.

BRIEF DESCRIPTION OF THE FIGURES

FIG. 1 shows a schematic process for producing a printed rigid plastic substrate; and.

DETAILED DESCRIPTION

Figure 1:
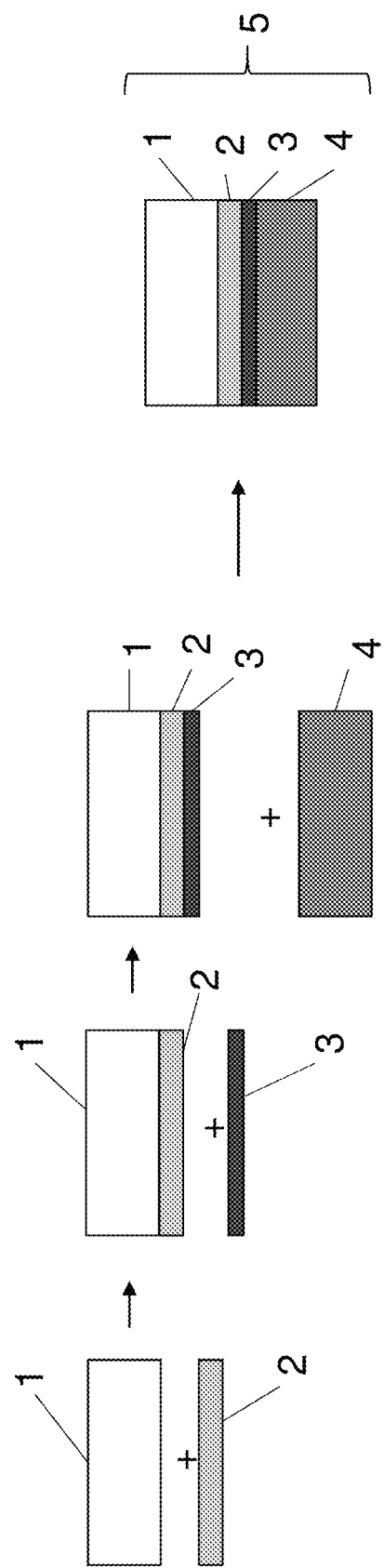

Before the present disclosure is disclosed and described, it is to be understood that this disclosure is not restricted to the particular process features and materials disclosed herein because such process features and materials may vary somewhat. It is also to be understood that the terminology used herein is used for the purpose of describing particular examples.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is generally suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "co-polymer" refers to a polymer that is polymerized from at least two monomers.

As used herein, "lamination bond strength" refers to the force (per length) required to delaminate a laminated material, and is expressed in units of Newton/inch, or N/in. The lamination bond strength can be measured according to standard techniques, in particular ISO 10373-1. Unless otherwise stated, the lamination bond strength of a printed rigid plastic substrate described herein refers to the strength to delaminate the material at the interface between a flexible film and a material to which the thermally activatable laminating material has bonded.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238 Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example, as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPas or cPoise. In some examples, the melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, for example, an electric field having a field gradient of 50-400V/μm, or more, in some examples, 600-900V/μm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl" may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

As used herein, "alkyl", or similar expressions such as "alk" in alkoxy, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 14 carbon atoms, or 5 to about 10 carbon atoms, and may be selected from, phenyl and naphthyl.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable as would be understood in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided a process for preparing a printed rigid plastic substrate. The process may comprise:
  providing a rigid plastic substrate comprising a primer on a surface of the rigid plastic substrate, the primer comprising a primer resin;
  printing a liquid electrophotographic ink composition comprising a thermoplastic resin onto the primer on the surface of the rigid plastic substrate;
  depositing a cross-linking composition comprising a cross-linker onto the printed electrophotographic ink composition disposed on the primer; and
  laminating the rigid plastic substrate with a flexible film such that the ink composition and the cross-linker are disposed between the rigid substrate and the flexible film and wherein the lamination of the rigid substrate with the flexible film causes cross-linking of the thermoplastic resin of the ink composition and of the primer resin.

In another aspect, there is provided a printed rigid plastic substrate. The printed rigid plastic substrate may comprise:
  a rigid plastic substrate comprising a primer layer disposed on a surface of the rigid substrate, the primer layer comprising a primer resin;
  a printed ink layer comprising a thermoplastic resin disposed on the primer layer;
  a cross-linker applied to the printed ink layer; and
  a flexible film laminated to the rigid plastic substrate such that the printed ink layer and the cross-linker are disposed between the rigid plastic substrate and the flexible film and such that the thermoplastic resin and the primer resin are cross-linked.

Liquid electrophotographic ink compositions contain thermoplastic resins which are melted during printing to fuse the chargeable particles comprised in the ink composition to each other and to the print substrate. As a result, liquid electrophotographic ink compositions comprise relatively low melting point materials, which cause particular issues during the production of printed rigid plastic substrates. Usually, the lamination of flexible films to rigid plastic substrates, in particular polyvinyl chloride substrates, is performed at about 120 to 150° C., a temperature at which both the rigid plastic substrate and the flexible film softens, allowing adhesion. However, liquid electrophotographic ink compositions also melt and flow at these temperatures, causing loss of print quality and interfering with the lamination of the rigid plastic substrate to the flexible film. Defects such as the haze effect (causing cloudiness of printed images) and colour distortion over time also affect quality of these liquid electrophotographically printed rigid plastic substrates.

The present inventors have found that examples of the processes and products described herein avoid or at least mitigate at least one of the difficulties described above.

Printed Rigid Plastic Substrate

In some examples, a printed rigid plastic substrate comprises a rigid plastic substrate comprising a primer layer disposed on a surface of the rigid substrate, the primer layer comprising a primer resin; a printed ink layer comprising a thermoplastic resin disposed on the primer layer; a cross-linker applied to the printed ink layer; and a flexible film laminated to the rigid plastic substrate such that the printed ink layer and the cross-linker are disposed between the rigid plastic substrate and the flexible film and such that the thermoplastic resin and the primer resin are cross-linked. In some examples, the printed rigid plastic substrate is produced by any of the methods described herein. Each component of the printed rigid plastic substrate will be discussed in the sections that follow.

In some examples, the printed rigid plastic substrate has a thickness of 2000 µm or less, in some examples, 1500 µm or less, in some examples, 1000 µm or less, in some examples, 950 µm or less, in some examples, 900 µm or less, in some examples, 850 µm or less, in some examples, 800 µm or less, in some examples, 790 µm or less, in some examples, 780 µm or less, in some examples, 770 µm or less, in some examples, 760 µm or less, in some examples, 750 µm or less, in some examples, 740 µm or less, in some examples, 730 µm or less, in some examples, 720 µm or less, in some examples, 710 µm or less, in some examples, 700 µm or less, in some examples, 650 µm or less, in some examples, 600 µm or less, in some examples, 550 µm or less, in some examples, 500 µm or less, in some examples, 450 µm or less, in some examples, 440 µm or less, in some examples, 430 µm or less, in some examples, 420 µm or less, in some examples, 410 µm or less, in some examples, 400 µm or less, in some examples, 390 µm or less, in some examples, 380 µm or less, in some examples, 370 µm or less, in some examples, 360 µm or less, in some examples, 350 µm or less, in some examples, 340 µm or less, in some examples, 330 µm or less, in some examples, 320 µm or less, in some examples, 310 µm or less, in some examples, 300 µm or less, in some examples, 250 µm or less, in some examples, 200 µm or less, in some examples 150 µm or less, in some examples about 100 µm.

In some examples, the printed rigid plastic substrate has a thickness of 100 µm or more, in some examples, 150 µm or more, in some examples, 200 µm or more, in some examples, 250 µm or more, in some examples, 300 µm or more, in some examples, 310 µm or more, in some examples, 320 µm or more, in some examples, 330 µm or more, in some examples, 340 µm or more, in some examples, 350 µm or more, in some examples, 360 µm or more, in some examples, 370 µm or more, in some examples, 380 µm or more, in some examples, 390 µm or more, in some examples, 400 µm or more, in some examples, 410 µm or more, in some examples, 420 µm or more, in some examples, 430 µm or more, in some examples, 440 µm or more, in some examples, 450 µm or more, in some examples, 500 µm or more, in some examples, 550 µm or more, in some examples, 600 µm or more, in some examples, 650 µm or more, in some examples, 700 µm or more, in some examples, 710 µm or more, in some examples, 720 µm or more, in some examples, 730 µm or more, in some examples, 740 µm or more, in some examples, 750 µm or more, in some examples, 760 µm or more, in some examples, 770 µm or more, in some examples, 780 µm or more, in some examples, 790 µm or more, in some examples, 800 µm or more, in some examples, 850 µm or more, in some examples, 900 µm or more, in some examples, 950 µm or more, in some examples, 1000 µm or more, in some examples, 1500 µm or more, in some examples, about 2000 µm.

In some examples, the printed rigid plastic substrate has a thickness of 100 µm to 2000 µm, in some examples, 250 µm to 1500 µm, in some examples, 300 µm to 1000 µm, in some examples, 310 µm to 950 µm.

In some examples, the printed rigid plastic substrate has a thickness of 300 µm to 450 µm, in some examples, 310 µm to 440 µm, in some examples, 310 µm to 430 µm, in some examples, 320 µm to 420 µm, in some examples, 330 µm to 410 µm, in some examples, 340 µm to 400 µm, in some examples, 350 µm to 400 µm, in some examples, 360 µm to 390 µm, in some examples, 370 µm to 380 µm.

In some examples, the printed rigid plastic substrate has a thickness of 450 µm to 950 µm, in some examples, 500 µm to 900 µm, in some examples, 550 µm to 850 µm, in some examples, 600 µm to 800 µm, in some examples, 650 µm to 800 µm, in some examples, 700 µm to 790 µm, in some examples, 710 µm to 790 µm, in some examples, 720 µm to 780 µm, in some examples, 730 µm to 780 µm, in some examples, 740 µm to 770 µm, in some examples, 750 µm to 770 µm, in some examples, 760 µm to 770 µm.

In some examples, the printed rigid plastic substrate comprises a rigid plastic substrate comprising a primer layer disposed on a surface of the rigid substrate and another primer layer disposed on the opposing surface of the rigid substrate, a printed ink layer disposed on each primer layer, a cross-linker disposed on each printed ink layer and a flexible film laminated to each surface of the rigid plastic substrate such that the printed ink layers and the cross-linkers are disposed between the rigid plastic substrate and the respective flexible films.

In some examples, the printed rigid plastic substrate comprises two printed rigid plastic substrates fused together via their back surfaces. Each printed rigid plastic substrate may comprise a primer layer disposed on a front surface thereof, a printed ink layer disposed on the primer layer, a cross-linker applied to the printed ink layer and a flexible film laminated to the rigid plastic substrate such that the printed ink layer and the cross-linker are disposed between the rigid plastic substrate and the flexible film.

Rigid Plastic Substrate

In some examples, the rigid plastic substrate is a plastic substrate that maintains its form in the absence of stress or strain. In some examples, the rigid plastic substrate flexes under moderate stress or strain, but returns to its original form upon removal of the stress or strain.

In some examples, the rigid plastic substrate has a tensile strength (yield) of at least 20 N/mm$^2$, for example at least 30 N/mm$^2$, for example at least 40 N/mm$^2$, for example at least 50 N/mm$^2$, for example at least 60 N/mm$^2$, for example at least 70 N/mm$^2$, for example at least 80 N/mm$^2$, for example at least 90 N/mm$^2$, for example at least 100 N/mm$^2$. In some example, the rigid plastic substrate has a tensile strength (yield) of less than 100 N/mm$^2$, for example less than 90 N/mm$^2$, less than 80 N/mm$^2$, less than 70 N/mm$^2$, less than 60 N/mm$^2$, less than 50 N/mm$^2$, less than 40 N/mm$^2$, less than 30 N/mm$^2$, for example about 20 N/mm$^2$. In some examples, the rigid plastic substrate has a tensile strength (yield) of between 20 N/mm$^2$ and 100 N/mm$^2$, for example between 30 N/mm$^2$ and 90 N/mm$^2$, for example between 40 N/mm$^2$ and 80 N/mm$^2$, for example between 50 N/mm$^2$ and 70 N/mm$^2$. Unless otherwise stated, tensile strength (yield) is measured in accordance with ASTM D-882.

In some examples, a rigid plastic substrate comprises a rigid plastic selected from polyvinyl chloride, polyvinyl chloride acetate, polycarbonate, and polyester. In some examples, the polyester may be polyethylene terephthalate or polyethylene terephthalate glycol. In some examples, polyvinyl chloride acetate comprises a copolymer of vinyl chloride monomers and acetate monomers. In some examples, the rigid plastic substrate comprises a rigid plastic selected from polyvinyl chloride, polyvinyl chloride acetate and polycarbonate. In some examples, the rigid plastic substrate comprises a rigid plastic selected from polyvinyl chloride and polycarbonate. In some examples, the rigid plastic substrate comprises a rigid plastic selected from polyvinyl chloride.

In some examples, the rigid plastic substrate is an opacified rigid plastic substrate. In some examples, the rigid plastic is selected from opacified polyvinyl chloride, opacified polyvinyl chloride acetate, opacified polycarbonate and opacified polyester. In some examples, the rigid plastic is selected from opacified polyvinyl chloride, opacified polyvinyl chloride acetate and opacified polycarbonate. In some examples, the rigid plastic is opacified polyvinyl chloride. In some examples, the rigid plastic substrate is a transparent or semi-transparent substrate. In some examples, the rigid plastic is selected from transparent or semi-transparent polyvinyl chloride, transparent or semi-transparent polyvinyl chloride acetate, transparent or semi-transparent polycarbonate and transparent or semi-transparent polyester. In some examples, the rigid plastic is selected from transparent or semi-transparent polyvinyl chloride, transparent or semi-transparent polyvinyl chloride acetate and transparent or semi-transparent polycarbonate. In some examples, the rigid plastic is transparent or semi-transparent polyvinyl chloride.

In some examples, the rigid plastic substrate has a thickness of 100 µm or more, in some examples, 150 µm or more, in some examples, 200 µm or more, in some examples, 210 µm or more, in some examples, 220 µm or more, in some examples, 230 µm or more, in some examples, 240 µm or more, in some examples, 250 µm or more, in some examples, 260 µm or more, in some examples, 270 µm or more, in some examples, 280 µm or more, in some examples, 290 µm or more, in some examples, 300 µm or more, in some examples, 310 µm or more, in some examples, 320 µm or more, in some examples, 330 µm or more, in some examples, 340 µm or more, in some examples, 350 µm or more, in some examples, 360 µm or more, in some examples, 370 µm or more, in some examples, 380 µm or more, in some examples, 390 µm or more, in some examples, 400 µm or more, in some examples, 450 µm or more, in some examples, 500 µm or more, in some examples, 550 µm or more, in some examples, 560 µm or more, in some examples, 570 µm or more, in some examples, 580 µm or more, in some examples, 590 µm or more, in some examples, 600 µm or more, in some examples, 610 µm or more, in some examples, 620 µm or more, in some examples, 630 µm or more, in some examples, 640 µm or more, in some examples, 650 µm or more, in some examples, 700 µm or more, in some examples, 750 µm or more, in some examples, about 800 µm.

In some examples, the rigid plastic substrate has a thickness of 800 µm or less, in some examples, 750 µm or less, in some examples, 700 µm or less, in some examples, 650 µm or less, in some examples, 640 µm or less, in some examples, 630 µm or less, in some examples, 620 µm or less, in some examples, 610 µm or less, in some examples, 600 µm or less, in some examples, 590 µm or less, in some examples, 580 µm or less, in some examples, 570 µm or less, in some examples, 560 µm or less, in some examples, 550 µm or less, in some examples, 500 µm or less, in some examples, 450 µm or less, in some examples, 400 µm or less, in some examples, 390 µm or less, in some examples, 380 µm or less, in some examples, 370 µm or less, in some examples, 360 µm or less, in some examples, 350 µm or less, in some examples, 340 µm or less, in some examples, 330 µm or less, in some examples, 320 µm or less, in some examples, 310 µm or less, in some examples, 300 µm or less, in some examples, 290 µm or less, in some examples, 280 µm or less, in some examples, 270 µm or less, in some examples, 260 µm or less, in some examples, 250 µm or less, in some examples, 240 µm or less, in some examples, 230 µm or less, in some examples, 220 µm or less, in some examples, 210 µm or less, in some examples, 200 µm or less, in some examples, 1500 µm or less, in some examples, about 100 µm.

In some examples, the rigid plastic substrate has a thickness of 100 µm to 800 µm, in some examples, 210 µm to 750 µm, in some examples, 220 µm to 700 µm, in some examples, 230 µm to 650 µm.

In some examples, the rigid plastic substrate has a thickness of 100 µm to 500 µm, in some examples, 210 µm to 400 µm, in some examples, 220 µm to 390 µm, in some examples, 230 µm to 380 µm, in some examples, 240 µm to 370 µm, in some examples, 250 µm to 360 µm, in some examples, 260 µm to 350 µm, in some examples, 270 µm to 340 µm, in some examples, 280 µm to 340 µm, in some examples, 290 µm to 330 µm, in some examples, 300 µm to 320 µm, in some examples, 310 µm to 320 µm.

In some examples, the rigid plastic substrate has a thickness of 400 µm to 800 µm, in some examples, 450 µm to 750 µm, in some examples, 500 µm to 700 µm, in some examples, 550 µm to 650 µm, in some examples, 560 µm to 640 µm, in some examples, 570 µm to 630 µm, in some examples, 580 µm to 620 µm, in some examples, 590 µm to 620 µm, in some examples, 600 µm to 610 µm.

In some examples, the rigid plastic substrate is provided with a layer of metallic ink on a surface thereof. In some examples, the layer of metallic ink may be applied as an aqueous or solvent based ink. In some examples the metallic ink is UV curable.

Primer

In some examples, the rigid plastic substrate comprises a primer on a surface of the rigid plastic substrate, the primer comprising a primer resin. In some examples, the rigid plastic substrate has a primer disposed on a surface of the rigid plastic substrate, with the liquid electrophotographic ink composition then being printed on the primer.

The primer may comprise a primer resin. In some examples, the primer resin may comprise or be selected from the group consisting of hydroxyl containing resins, carboxylic group containing resins, and amine based polymer formulations. In some examples a hydroxyl containing resin may be selected from polyvinyl alcohol resins, for example, polyvinyl alcohol based resins such as polyvinyl butyral formulation (Butvar, Eastman), Vinnol® (Wacker polymers), cellulose derivative additives (Eastman), polyester (Dynapol, Evonic) and polyurethane based formulations with hydroxyl groups. In some examples, the carboxylic group containing resins may be selected from: olefin co-acrylic or methacrylic acid based copolymers, polyacrylic acid based polymers, polylactic acid based polymers. In some examples, the amine based polymer formulations may be selected from polyamines, polyethylene imines. The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, and polyacrylic polymers.

In some examples, the primer resin comprises a carboxylic functional group, an amine functional group or a polyol functional group. In some examples, the primer resin comprises an amine functional group or a carboxylic functional group.

In some examples, the primer resin comprises an amine functional group. In some examples, the primer resin comprises or consists of a polyethylene imine resin. Examples of material suitable as a primer are DP050, DP060, DP4431 and DP5000 (all available from Michelman, Inc.).

In some examples, the primer layer disposed on the rigid plastic substrate of the printed rigid plastic substrate comprises a cross-linked primer resin.

In some examples, the primer on the surface of the rigid plastic substrate onto which the liquid electrophotographic ink composition is printed is provided in an amount such that the coat weight of the primer resin on the rigid plastic substrate is at least $0.01$ $g/m^2$, in some examples, at least $0.05$ $g/m^2$, in some examples, at least $0.1$ $g/m^2$, in some examples, at least $0.15$ $g/m^2$, in some examples, about $0.18$ $g/m^2$. In some examples, the primer is provided in an amount such that the coat weight of the primer resin on the print substrate is up to about $0.2$ $g/m^2$, in some examples, up to about $0.5$ $g/m^2$, in some examples, up to about $1$ $g/m^2$, in some examples, up to about $1.5$ $g/m^2$, in some examples, up to about $2$ $g/m^2$, in some examples, up to about $2.5$ $g/m^2$, in some examples, up to about $3$ $g/m^2$.

Liquid Electrophotographic Ink Composition

The liquid electrophotographic ink composition which may be printed on the rigid plastic substrate, for example, the rigid plastic substrate comprising a primer disposed on a surface of the rigid plastic substrate, may comprise a thermoplastic resin.

In some examples, the thermoplastic resin of the liquid electrophotographic ink composition may comprise a carboxylic functional group, an amine functional group or a polyol functional group. In some examples, the thermoplastic resin of the liquid electrophotographic ink composition comprises a carboxylic functional group.

In some examples, the thermoplastic resin comprises a polymer having acidic side groups. In some examples, the acidic side groups may be in free acid form or may be in the form of an anion and associated with a counterion, generally metal counterions, for example, a metal selected from the alkali metals, such as lithium, sodium and potassium, alkali earth metals, such as magnesium or calcium, and transition metals, such as zinc. The polymer having acidic side groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g., Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid may constitute from 5 wt. % to about 25 wt. % of the co-polymer, in some examples, from 10 wt. % to about 20 wt. % of the co-polymer.

In some examples, the thermoplastic resin of the liquid electrophotographic ink composition comprises polyolefin copolymers, polyethylene co-acrylic copolymers, polyethylene co-methacrylic copolymers, polyethylene co-vinyl acetate copolymers, ionomers, or combinations thereof. In some examples the thermoplastic resin of the ink composition comprises or consists of alkylene acrylic or methacrylic acid resins, polyurethane resins, polyethylene imine resins, polyamide resin, polyvinyl alcohol and combinations thereof.

In some examples the electrostatic ink composition comprises a thermoplastic resin comprising a copolymer of an alkylene monomer and a monomer selected from acrylic acid and methacrylic acid.

Liquid electrophotographic printing is a printing method by which images or information can be printed onto substrates such as plastic. The printing process generally involves creating an image on a photoconductive surface, applying a liquid electrophotographic ink composition having charged particles to the photoconductive surface, such that the charged particles selectively bind to the image and then transferring the charged particles in the form of the image to a substrate.

In some examples, the liquid electrophotographic ink composition (also referred to herein as an LEP composition) is printed on the rigid plastic substrate using a liquid electrophotographic printing process (also referred to herein as an LEP printing process.

In some examples, the liquid electrophotographic ink composition may comprise a colorant or a pigment, a thermoplastic resin and a carrier liquid. The liquid electrophotographic ink composition may further comprise an additive such as a charge director, charge adjuvant, surfactant, viscosity modifier, emulsifier and the like. In some examples, the liquid electrophotographic ink composition may not contain any pigment, or comprise substantially zero pigment and thus be a pigment-free composition, useful in providing a particular transparent gloss or sheen to a printed substrate.

In some examples, after printing, a liquid electrophotographic ink composition, which may be printed on the primer disposed on the surface of the rigid plastic substrate, may comprise a reduced amount of carrier liquid compared with the liquid electrophotographic ink composition before printing. In some examples, after printing, the liquid electrophotographic ink composition may be substantially free from carrier liquid. Substantially free from carrier liquid may indicate that the ink printed on the primer on the rigid plastic substrate contains less than 5 wt. % carrier liquid, in some examples, less than 2 wt. % carrier liquid, in some examples, less than 1 wt. % carrier liquid, in some examples, less than 0.5 wt. % carrier liquid. In some examples, after printing, the liquid electrophotographic ink composition printed on the primer on the rigid plastic substrate is free from carrier liquid.

Each of the components of an electrostatic ink composition, which may be the electrostatic ink composition printed on the primer on the rigid plastic substrate, will be described separately in the sub-sections which follow.

Colorant

A liquid electrophotographic ink composition may comprise a colorant. The colorant may be a dye or pigment. The colorant can be any colorant compatible with the liquid carrier and useful for liquid electrophotographic printing. For example, the colorant may be present as pigment particles, or may comprise a resin (in addition to the polymers described herein) and a pigment. The resins and pigments can be any of those standardly used. In some examples, the colorant is selected from a cyan pigment, a magenta pigment, a yellow pigment, a black pigment and a white pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

In some examples, the colorant or pigment particles may have a median particle size or $d_{50}$ of less than 20 μm, for example, less than 15 μm, for example, less than 10 μm, for example, less than 5 μm, for example, less than 4 μm, for example, less than 3 μm, for example, less than 2 μm, for example, less than 1 μm, for example, less than 0.9 μm, for example, less than 0.8 μm, for example, less than 0.7 μm, for example, less than 0.6 μm, for example, less than 0.5 μm. Unless otherwise stated, the particle size of the colorant or pigment particle and the resin coated pigment particle is determined using laser diffraction on a Malvern Mastersizer 2000 according to the standard procedure as described in the operating manual.

The colorant or pigment particle may be present in an electrostatic ink composition in an amount of from 10 wt. % to 80 wt. % of the total amount of resin and pigment, in some examples, 15 wt. % to 80 wt. %, in some examples, 15 wt. % to 60 wt. %, in some examples, 15 wt. % to 50 wt. %, in some examples, 15 wt. % to 40 wt. %, in some examples, 15 wt. % to 30 wt. % of the total amount of resin and colorant. In some examples, the colorant or pigment particle may be present in an electrostatic ink composition in an amount of at least 50 wt. % of the total amount of resin and colorant or pigment, for example at least 55 wt. % of the total amount of resin and colorant or pigment.

Thermoplastic Resin

In some examples, the liquid electrophotographic ink composition is or comprises a polymer resin as the thermoplastic resin. In some examples, the electrophotographic ink composition comprises a polymer resin comprising a polymer having acidic side groups. In some examples, the electrophotographic ink composition comprises a polymer resin comprising a copolymer of an alkylene monomer and a monomer selected from acrylic acid and methacrylic acid.

The polymer resin or thermoplastic resin may be referred to as a thermoplastic polymer. In some examples, the polymer resin may comprise ethylene or propylene acrylic acid co-polymers; ethylene or propylene methacrylic acid co-polymers; ethylene vinyl acetate co-polymers; co-polymers of ethylene or propylene (e.g. 80 wt. % to 99.9 wt. %), and alkyl (e.g. C1 to C5) ester of methacrylic or acrylic acid (e.g. 0.1 wt. % to 20 wt. %); co-polymers of ethylene (e.g. 80 wt. % to 99.9 wt. %), acrylic or methacrylic acid (e.g. 0.1 wt. % to 20.0 wt. %) and alkyl (e.g. C1 to C5) ester of methacrylic or acrylic acid (e.g. 0.1 wt. % to 20 wt. %); co-polymers of ethylene or propylene (e.g. 70 wt. % to 99.9 wt. %) and maleic anhydride (e.g. 0.1 wt. % to 30 wt. %); polyethylene; polystyrene; isotactic polypropylene (crystalline); co-polymers of ethylene and ethyl acrylate; polyesters; polyvinyl toluene; polyamides; styrene/butadiene co-polymers; epoxy resins; acrylic resins (e.g., co-polymer of acrylic or methacrylic acid and at least one alkyl ester of acrylic or methacrylic acid wherein alkyl may have from 1 to about 20 carbon atoms, such as methyl methacrylate (e.g., 50% to 90%)/methacrylic acid (e.g., 0 wt. % to 20 wt. %)/ethylhexylacrylate (e.g., 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers or combinations thereof.

The polymer resin may comprise a polymer having acidic side groups. Examples of the polymer having acidic side groups will now be described. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. Acidity of a polymer, as measured in mg KOH/g, can be measured by using standard procedures, for example, using the procedure described in ASTM D1386.

The polymer resin may comprise a polymer having acidic side groups, that has a melt flow rate of about 70 g/10 minutes or less, in some examples, about 60 g/10 minutes or less, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the particles each individually have a melt flow rate of 90 g/10 minutes or less, in some examples, 80 g/10 minutes or less, in some examples, 80 g/10 minutes or less, in some examples, 70 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to 40 g/10 minutes, in some examples, 20 g/10 minutes to 30 g/10 minutes. The polymer having acidic side groups can have a melt flow rate of, in some examples, about 50 g/10 minutes to about 120 g/10 minutes, in some examples, 60 g/10 minutes to about 100 g/10 minutes. The melt flow rate can be measured by using standard procedures, for example, as described in ASTM D1238.

The acidic side groups may be in free acid form or may be in the form of an anion and associated with a counterion, generally metal counterions, for example, a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g., Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt. % to about 25 wt. % of the co-polymer, in some examples, from 10 wt. % to about 20 wt. % of the co-polymer.

The polymer resin may comprise two different polymers having acidic side groups. The two polymers having acidic side groups may have different acidities, which may fall within the ranges mentioned above. The polymer resin may comprise a first polymer having acidic side groups that has an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has an acidity of 110 mg KOH/g to 130 mg KOH/g.

The polymer resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples, about 4:1.

The polymer resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The polymer resin may comprise a first polymer having a melt viscosity of 15000 poise or more, in some examples, 20000 poise or more, in some examples, 50000 poise or more, in some examples, 70000 poise or more; and in some examples, the polymer resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. The polymer resin may comprise a first polymer having a melt viscosity of more than 60000 poise, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the polymer resin comprises a single type of polymer, the polymer (excluding any other components of the electrophotographic ink composition) may have a melt viscosity of 6000 poise or more, in some examples, a melt viscosity of 8000 poise or more, in some examples, a melt viscosity of 10000 poise or more, in some examples, a melt viscosity of 12000 poise or more. If the polymer resin comprises a plurality of polymers all the polymers of the polymer resin may together form a mixture (excluding any other components of the electrophotographic ink composition) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured by using standard techniques. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The polymer resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt. % to about 16 wt. % of the co-polymer, in some examples, 10 wt. % to 16 wt. % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt. % to about 30 wt. % of the co-polymer, in some examples, from 14 wt. % to about 20 wt. % of the co-polymer, in some examples, from 16 wt. % to about 20 wt. % of the co-polymer, in some examples, from 17 wt. % to 19 wt. % of the co-polymer.

The polymer resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples, an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples, 5% to 40% by weight, in some examples, 5% to 20% by weight of the co-polymer, in some examples, 5% to 15% by weight of the co-polymer. The second monomer may constitute 1% to 50% by weight of the co-polymer, in some examples, 5% to 40% by weight of the co-polymer, in some examples, 5% to 20% by weight of the co-polymer, in some examples, 5% to 15% by weight of the co-polymer. In some examples, the first monomer constitutes 5% to 40% by weight of the co-polymer and the second monomer constitutes 5% to 40% by weight of the co-polymer, with the third monomer constituting the remaining weight of the co-polymer. In some examples, the first monomer constitutes 5% to 15% by weight of the co-polymer and the second monomer constitutes 5% to 15% by weight of the co-polymer, with the third monomer constituting the remaining weight of the co-polymer. In some examples, the first monomer constitutes 8% to 12% by weight of the co-polymer and the second monomer constitutes 8% to 12% by weight of the co-polymer, with the third monomer constituting the remaining weight of the co-polymer. In some examples, the first monomer constitutes about 10% by weight of the co-polymer and the second monomer constitutes about 10% by weight of the co-polymer, with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, for example, thermoplastic resin polymers, in the liquid electrophotographic ink composition and/or the ink printed on the rigid plastic substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples, 8% or more by weight of the total amount of the resin polymers, e.g. thermoplastic resin polymers, in some examples, 10% or more by weight of the total amount of the resin polymers, e.g. thermoplastic resin polymers, in some examples, 15% or more by weight of the total amount of the resin polymers, e.g. thermoplastic resin polymers, in some examples, 20% or more by weight of the total amount of the resin polymers, e.g. thermoplastic resin polymers, in some examples, 25% or more by weight of the total amount of the resin polymers, e.g. thermoplastic resin polymers, in some examples, 30% or more by weight of the total amount of the resin polymers, e.g. thermoplastic resin polymers, in some examples, 35% or more by weight of the total amount of the resin polymers, e.g. thermoplastic resin polymers, in the liquid electrophotographic composition and/or the ink printed on the rigid plastic substrate. The polymer having ester side groups may constitute from 5% to 50% by weight of the total amount of the resin polymers, e.g. thermoplastic resin polymers, in the liquid electrophotographic composition and/or the ink printed on the rigid plastic substrate, in some examples, 10% to 40% by weight of the total amount of the resin polymers, e.g. thermoplastic resin polymers, in the liquid electrophotographic composition and/or the ink composition printed on the rigid plastic substrate, in some examples, 5% to 30% by weight of the total amount of the resin polymers, e.g. thermoplastic resin polymers, in the liquid electrophotographic composition and/or the ink composition printed on the rigid plastic substrate, in some examples, 5% to 15% by weight of the total amount of the resin polymers, e.g. thermoplastic resin polymers, in the liquid electrophotographic composition and/or the ink composition printed on the rigid plastic substrate, in some examples, 15% to 30% by weight of the total amount of the resin polymers, e.g. thermoplastic resin polymers, in the liquid electrophotographic composition and/or the ink composition printed on the rigid plastic substrate.

The polymer having ester side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more. The polymer having ester side groups may have an acidity of 100 mg KOH/g or less, in some examples, 90 mg KOH/g or less. The polymer having ester side groups may have an acidity of 60 mg KOH/g to 90 mg KOH/g, in some examples, 70 mg KOH/g to 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

The polymer, polymers, co-polymer or co-polymers of the thermoplastic resin can in some examples be selected from the Nucrel family of toners (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of toners (e.g., AC-5120, AC-5180, AC-540, AC-580 (sold by Honeywell)), the Aclyn family of toners (e.g., Aclyn 201, Aclyn 246, Aclyn 285, and Aclyn 295), and the Lotader family of toners (e.g., Lotader 2210, Lotader, 3430, and Lotader 8200 (sold by Arkema)).

The polymer resin can constitute about 5% to 90%, in some examples, about 50% to 80%, by weight of the solids of the liquid electrophotographic composition and/or the ink composition printed on the rigid plastic substrate. The resin can constitute about 60% to 95%, in some examples, about 70% to 95%, by weight of the solids of the liquid electrophotographic composition and/or the ink composition printed on the rigid plastic substrate.

Carrier Liquid

In some examples, an electrophotographic ink composition described herein comprises polymer resin coated pigment particles, or polymer resin particles, which are formed in and/or dispersed in a carrier fluid or carrier liquid. Before application to the rigid plastic substrate in an electrophotographic printing process, the ink composition may be an electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In some examples, the carrier liquid is a liquid which does not dissolve the polymer resin at room temperature. In some examples, the carrier liquid is a liquid which dissolves the polymer resin at elevated temperatures. For example, the polymer resin may be soluble in the carrier liquid when heated to a temperature of at least 80° C., for example, 90° C., for example, 100° C., for example, 110° C., for example, 120° C. For example, the carrier liquid can comprise or be a hydrocarbon, silicone oil, vegetable oil, etc. The carrier liquid can include an insulating, non-polar, non-aqueous liquid that can be used as a medium for toner particles. The carrier liquid can include compounds that have a resistivity in excess of about $10^9$ ohmcm. The carrier liquid may have a dielectric constant below about 5, in some examples, below about 3. The carrier liquid can include hydrocarbons. The hydrocarbon can include an aliphatic hydrocarbon, an isomerized aliphatic hydrocarbon, branched chain aliphatic hydrocarbons, aromatic hydrocarbons, and combinations thereof. Examples of the carrier liquids include aliphatic hydrocarbons, isoparaffinic compounds, paraffinic compounds, dearomatized hydrocarbon compounds, and the like. In particular, the carrier liquids can include Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-S™, AF 6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of an electrostatic ink composition, in some examples, 50% to 99.5% by weight of an electrostatic ink composition. Before printing, the carrier liquid may constitute about 40% to 90% by weight of an electrostatic ink composition. Before printing, the carrier liquid may constitute about 60% to 80% by weight of an electrostatic ink composition. Before printing, the carrier liquid may constitute about 90% to 99.5% by weight of an electrostatic ink composition, in some examples 95% to 99% by weight of an electrostatic ink composition.

An electrostatic ink composition, when printed on a rigid plastic substrate may be substantially free from carrier liquid. In an electrostatic printing process and/or afterwards, the carrier liquid may be removed, for example, by an electrophoresis processes during printing and/or evaporation, such that substantially just solids are transferred to the rigid plastic substrate. Substantially free from carrier liquid may indicate that the ink printed on the rigid plastic substrate contains 5 wt. % or less carrier liquid, in some examples, 2 wt. % or less carrier liquid, in some examples, 1 wt. % or less carrier liquid, in some examples, 0.5 wt. % or less carrier liquid. In some examples, the ink printed on a rigid plastic substrate is free from carrier liquid.

Charge Director and Charge Adjuvant

A liquid electrophotographic composition and/or the ink composition printed on the rigid plastic substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, for example, metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula: $[R_a\text{—O—}C(O)CH_2CH(SO_3^-)C(O)\text{—O—}R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a\text{—O—}C(O)CH_2CH(SO_3^-)\ C(O)\text{—O—}R_b]$, where each of $R_a$ and $R_b$ is an alkyl group, or other charge directors as found in WO2007130069, which is incorporated herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples, 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{3+}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulfonate salt is dodecyl benzene sulfonic acid isopropyl amine, which is available from Croda.

In an electrostatic ink composition, the charge director can constitute about 0.001% to 20%, in some examples, 0.01% to 20% by weight, in some examples, 0.01% to 10% by weight, in some examples, 0.01% to 1% by weight of the solids of an electrostatic ink composition and/or ink composition printed on the rigid plastic substrate. The charge director can constitute about 0.001% to 0.15% by weight of the solids of a liquid electrophotographic ink composition and/or ink composition printed on the rigid plastic substrate, in some examples, 0.001% to 0.15%, in some examples, 0.001% to 0.02% by weight of the solids of a liquid electrophotographic ink composition and/or ink composition printed on the rigid plastic substrate. In some examples, a charge director imparts a negative charge on an electrostatic ink composition. The particle conductivity may range from 50 to 500 pmho/cm, in some examples, from 200 to 350 pmho/cm.

A liquid electrophotographic ink composition and/or ink composition printed on the rigid plastic substrate can include a charge adjuvant. A charge adjuvant may be present with a charge director, and may be different to the charge director, and act to increase and/or stabilise the charge on particles, e.g. resin-containing particles, of an electrostatic ink composition. The charge adjuvant can include barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethyl-hexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di- and/or tristearate and/or aluminium di- and/or tripalmitate.

The charge adjuvant can constitute about 0.1% to 5% by weight of the solids of a liquid electrophotographic ink composition and/or ink composition printed on the rigid plastic substrate. The charge adjuvant can constitute about 0.5% to 4% by weight of the solids of a liquid electrophotographic ink composition and/or ink composition printed on the rigid plastic substrate. The charge adjuvant can constitute about 1% to 3% by weight of the solids of a liquid electrophotographic ink composition and/or ink composition printed on the rigid plastic substrate.

Other Additives

In some examples, an electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, for example, from an intermediate transfer member, which may be a heated blanket.

Cross-Linking Composition

The cross-linking composition may comprise a cross-linker, for example, for cross-linking the thermoplastic resin of the ink composition and for cross-linking the primer resin of the primer. Depositing a cross-linking composition comprising a cross-linker onto the printed ink composition, e.g. printed ink layer, disposed on the primer on a surface of the rigid plastic substrate may cross-link the thermoplastic resin of the ink composition and cross-link the primer resin of the primer. Cross-linking the thermoplastic resin of the ink composition may increase cohesion in the printed ink composition disposed on the rigid plastic substrate. Cross-linking the thermoplastic resin of the ink composition may increase the melting temperature of the ink composition. Cross-linking the primer resin of the primer may increase cohesion within the primer. Cross-linking the primer resin may also limit mobility of the ink composition disposed on the primer layer. Cross-linking between the primer resin and the thermoplastic resin may improve binding between the primer and the ink composition, reduce the mobility of the ink composition and/or the primer, and/or increase the melting temperature of the ink composition. Cross-linking of the primer resin of the primer, cross-linking of the thermoplastic resin of the ink composition and/or cross-linking of the primer resin of the primer to the thermoplastic resin of the ink composition may improve the lamination bond strength of the printed rigid plastic substrate.

The cross-linker may be any cross-linker suitable to cross-link the thermoplastic resin of the ink composition and to cross-link the primer resin of the primer. In some examples, the cross-linker may cross-link one or more of the thermoplastic resin within the ink composition, the primer resin within the primer and the thermoplastic resin of the ink composition with the primer resin of the primer.

In some examples, the cross-linking composition comprises a cross-linker which is reactive towards a carboxylic functional group, an amine functional group, a polyol functional group, or a combination thereof.

In some examples, the cross-linking composition comprises a cross-linker that is reactive towards a carboxylic functional group and/or an amine functional group.

In some examples, the cross-linker may cross-link the thermoplastic resin within the ink composition, cross-link the thermoplastic resin of the ink composition with the primer resin of the primer and cross-link the primer resin within the primer.

For example, when the thermoplastic resin and/or the primer resin comprise a carboxylic functional group the cross-linker may comprise an epoxide, an aziridine, an organic metallic complex or ion, an organosilane, an epoxy organosilane, a carbodiimide, an isocyanate or an acetyl acetonate.

For example, when the thermoplastic resin and/or the primer resin comprise an amine functional group, the cross-linker may comprise an epoxide, an aziridine, an isocyanate, a maleic anhydride, an isocyanate alkyl organosilane, an epoxy organosilane, a carbodiimide, an aldehyde, a ketone, an acetyl acetonate, an isothiocyanate, an acyl azide, an NHS ester, a sulfonyl chlorides glyoxal, a carbonate, an aryl halide or an imidoester.

In some examples, when the thermoplastic resin comprises a polymer having acid side groups and the primer resin comprises an amine functional group (e.g. polyethylene imine), the cross-linker may be selected from an epoxy-based cross-linker, an aziridine-based cross-linker, an isocyanate-based cross-linker or a carbodiimide-based cross-linker. In some examples, when the thermoplastic resin comprises a polymer having acid side groups and the primer resin comprises an amine functional group (e.g. polyethylene imine), the cross-linker may be an epoxy-based cross-linker.

In some examples, the cross-linking composition comprises a cross-linker selected from an epoxide, an aziridine, an isocyanate, a maleic anhydride, an organic metallic complex or ion, an organosilane, an epoxy organosilane, a carbodiimide, an aldehyde, a ketone, an acetyl acetonate or combinations thereof. For example, the cross-linking composition may comprise an epoxide, an aziridine, an isocyanate, a maleic anhydride, an organic metallic complex or ion, an organosilane, an epoxy organosilane, a carbodiimide, an aldehyde, a ketone, an acetyl acetonate or combinations thereof.

In some examples, the cross-linking composition comprises a cross-linker selected from an epoxide, an aziridine, an isocyanate and a carbodiimide. For example, the cross-linking composition may comprise an epoxide, an aziridine, an isocyanate, or a carbodiimide.

In some examples, the cross-linking composition comprises a cross-linker selected from an epoxide, an aziridine, and a carbodiimide. For example, the cross-linking composition may comprise an epoxide, an aziridine, or a carbodiimide.

In some examples the cross-linking composition comprises an epoxide as the cross-linker.

In some examples, the cross-linking composition comprises a cross-linker in an amount of about 0.01 wt. % or more by total weight of the cross-linking composition, in some examples, about 0.1 wt. % or more, in some examples, about 0.5 wt. % or more, in some examples, about 1 wt. % or more, in some examples, about 1.5 wt. % or more, in some examples, about 2 wt. % or more, in some examples, about 2.5 wt. % or more, in some examples, about 3 wt. % or more, in some examples, about 4 wt. % or more, in some examples, about 5 wt. % or more, in some examples about 5 wt. %.

In some examples, the cross-linking composition comprises a cross-linker in an amount up to about 20 wt. % by total weight of the cross-linking composition, in some examples, up to about 15 wt. %, in some examples, up to about 10 wt. %. The remaining wt. % of the cross-linking composition may be a carrier solvent as described below.

In some examples, the cross-linking composition comprises a cross-linker in an amount within the range of about 0.5 wt. % to about 10 wt. % by total weight of the cross-linking composition. In some examples, the cross-linking composition comprises a cross-linker in an amount within the range of about 0.5 wt. % to about 20 wt. % by total weight of the cross-linking composition. In some examples, the cross-linking composition comprises a cross-linker in an amount within the range of about 10 wt. % to about 20 wt. % by total weight of the cross-linking composition. In some examples, the cross-linking composition comprises a cross-linker in an amount within the range of about 15 wt. % to about 20 wt. % by total weight of the cross-linking composition.

In some examples the cross-linking composition comprises a carrier solvent in which the cross-linker may be dissolved or dispersed. In some examples, the carrier solvent is selected from water, ethyl acetate, ethanol, methyl ethyl ketone, acetone, isopropanol and combinations thereof.

In some examples, the cross-linking composition comprises a carrier solvent present in an amount of about 80 wt. % or more by total weight of the cross-linking composition, in some examples, about 85 wt. % or more, in some examples, about 90 wt. % or more, in some examples, about 95 wt. %.

In some examples, the cross-linking composition comprises a carrier solvent present in an amount up to about 99.99 wt. %, in some examples, up to about 99.95 wt. %, in some examples, up to about 99.5 wt. %, in some examples, up to about 99 wt. %, in some examples, up to about 98.5 wt. %, in some examples, up to about 98 wt. %, in some examples, up to about 97 wt. %, in some examples, up to about 96 wt. %, in some examples, up to about 95 wt. %, in some examples, up to about 90 wt. %, in some examples, up to about 85 wt. %, in some examples, up to about 80 wt. %.

In some examples, the cross-linking composition comprises a carrier solvent present in an amount in the range of about 80 wt. % to about 99.99 wt. %.

In some examples, the cross-linking composition comprises:
 a cross-linker in an amount within the range of about 0.5 wt. % to about 20 wt. % by total weight of the cross-linking composition; and
 a carrier solvent in an amount within the range of about 80 wt. % to about 99.5 wt. %.

In some examples, after depositing the cross-linking composition the carrier solvent is removed, in some examples, by evaporation, before the lamination of the flexible film to the rigid plastic substrate.

In some examples, the cross-linking composition may comprise a photo-initiator.

The cross-linker may comprise a group selected from epoxy, aziridine, isocyanate, maleic anhydride, anhydride, organosilane, epoxy oganosilane, carbodiimide, aldehyde, ketone, acetyl acetonate, organic metallic complexes or ions, or a combination thereof.

In some examples, the cross-linker may be an epoxy-based cross-linker, aziridine-based cross-linker, isocyanate-based cross-linker, maleic anhydride-based cross-linker, anhydride-based cross-linker, organosilane-based cross-linker, epoxyoganosilane-based cross-linker, carbodiimide-based cross-linker, aldehyde-based cross-linker, ketone-based cross-linker, acetyl acetonate-based cross-linker as described below.

In some examples, the cross-linker has a molecular weight of more than 5000 Daltons. In some examples, the cross-linker has a molecular weight of 5000 Daltons or less, in some examples, 4000 Daltons or less, in some examples, 3000 Daltons or less, in some examples, 1500 Daltons or less, in some examples, a molecular weight of 1000 Daltons or less, in some examples, a molecular weight of 700 Daltons or less, in some examples, a molecular weight of 600 Daltons or less. In some examples, the cross-linker has a molecular weight of from 100 to 1500 Daltons, in some examples, a molecular weight of from 100 to 600 Daltons.

In some examples, the cross-linker comprises a group selected from epoxy, aziridine, isocyanate or carbodiimide.

In some examples, the cross-linker comprises a polyepoxide, a polyaziridine, a polyisocyanate or a polycarbodiimide.

In some examples, the cross-linker is an epoxy-based cross-linker, for example, a polyepoxide. The term "polyepoxide" is used herein to refer to a molecule comprising at least two epoxy groups, e.g., of the formula —CH(O)CR$^1$H, wherein R$^1$ is selected from H and alkyl, in some examples, wherein R$^1$ is H.

In some examples, the epoxy-based cross-linker is of the formula (I).

wherein, in each (Y[Z—F]$_m$), Y, Z and F are each independently selected, such that F is an epoxy group, e.g. of the formula —CH(O)CR$^1$H, wherein R$^1$ is selected from H and alkyl;

Z is alkylene,

Y is selected from (i) a single bond, —O—, —C(=O)—O—, —O—C(=O)— wherein m is 1 or (ii) Y is NH$_{2-m}$ wherein m is 1 or 2, n is at least 1, in some example, at least 2, in some examples, 2-4, and X is an organic group.

In some examples, the cross-linker of formula (I) has at least two F groups.

In some examples, F is an epoxide of the formula —CH(O)CR$^1$H in which R$^1$ is H.

X may comprise or be an organic group selected from optionally substituted alkylene, optionally substituted alkyl, optionally substituted aryl, optionally substituted arylalkyl, optionally substituted alkylaryl, isocyanurate, and a polysiloxane. X may comprise a polymeric component; in some examples, the polymeric components may be selected from a polysilane, polysiloxane (such as poly(dimethyl siloxane), a polyalkylene (such as polyethylene or polypropylene), an acrylate (such as methyl acrylate) and a poly(alkylene glycol) (such as poly(ethylene glycol) and poly(propylene glycol)), and combinations thereof. In some examples, X comprises a polymeric backbone, comprising a plurality of repeating units, each of which is covalently bonded to (Y[Z—F]$_m$), with Y, Z, F and m as described herein. X may be selected from a group selected from a branched or straight-chain C$_{1-5}$ alkyl (e.g. methyl), phenyl, methylene bisphenyl, trisphenylmethane, cyclohexane, and isocyanurate.

In some examples, Y is selected from a single bond, —O—, —C(=O)—O—, —O—C(=O)—, m is 1, and X is an organic group selected from alkylene (e.g. C$_{1-6}$ alkylene), optionally substituted alkylene (e.g. C$_{1-6}$ alkylene), aryl (e.g. C$_{5-12}$ aryl), optionally substituted aryl (e.g. C$_{5-12}$ aryl), arylalkyl (e.g. C$_{6-20}$ arylalkyl), optionally substituted arylalkyl (e.g. C$_{6-20}$ arylalkyl), alkylaryl (e.g. C$_{6-20}$ alkylaryl) and optionally substituted alkylaryl (e.g. C$_{6-20}$ alkylaryl). In some examples, Y is selected from a single bond, —O—, —C(=O)—O—, —O—C(=O)—, m is 1, and X is an organic group selected from alkylene, aryl, arylalkyl, and alkylaryl. In some examples, Y is selected from a single bond, —O—, —C(=O)—O—, —O—C(=O)—, m is 1, and X is an organic group selected from C$_{1-6}$ alkylene, C$_{5-12}$ aryl, C$_{6-20}$ arylalkyl, and C$_{6-20}$ alkylaryl. In some examples, Y is selected from a single bond, —O—, —C(=O)—O—, —O—C(=O)—, m is 1, and X is an organic group selected from C$_{1-6}$ alkylene (e.g. methylene), phenyl, methylene bisphenyl, trisphenylmethane, cyclohexane.

In some examples, X is selected from (i) an alkane, which may be an optionally substituted straight chain, branched or cyclo-alkane, (ii) a cyclo alkane having at least two substituents that are Y—[Z—F]$_m$ and (iii) an aryl (such as phenyl). In some examples, X is selected from (i) a branched alkane, with at least two of the alkyl branches covalently bonded to (Y—[Z—F]$_m$) and (ii) a cyclo alkane having at least two substituents that are Y—[Z—F]$_m$ and (iii) an aryl (such as phenyl) having at least two substituents that are Y[Z—F]$_m$; Y is selected from (i) —O—, —C(=O)—O—, —O—C(=O)— and m is 1 or (ii) Y is —NH$_{2-m}$, wherein m is 1 or 2; Z is C$_{1-4}$ alkylene; F is an epoxide of the formula —CH(O)CR$^1$H, wherein R$^1$ is selected from H and methyl, and in some examples F is an epoxide of the formula —CH(O)CR$^1$H in which R$^1$ is H.

In some examples, Z—F is an epoxycycloalkyl group. In some examples, Z—F is an epoxycyclohexyl group. In some examples, Z—F is an epoxycyclohexyl group, in some examples, a 3,4 epoxycyclohexyl group. In some examples, the cross-linker comprises two epoxycycloalkyl groups, in some examples, two epoxycyclohexyl groups.

In some examples, the cross-linker comprises two epoxycycloalkyl groups, which are bonded to one another via a linker species; and the linker species may be selected from a single bond, optionally substituted alkyl, optionally substituted aryl, optionally substituted arylalkyl, optionally substituted alkylaryl, isocyanurate, a polysiloxane, —O—, —C(=O)—O—, —O—C(=O)—, and amino and combinations thereof. In some examples, the linker species may be selected from alkylene, —O—, —C(=O)—O— and —O—C(=O)—. In some examples, the linker species may be selected from —C(=O)—O— and —O—C(=O)—.

In some examples, the epoxy-based cross-linker is selected from the DECH family of epoxy-based cross-linkers (including 3,4-epoxycyclohexylmethyl 3,4-epoxycyclohexanecarboxylate and 7-oxabicyclo[4.1.0]hept-3-ylmethyl 7-oxabicyclo[4.1.0]heptane-3-carboxylate) and tris(4-hydroxyphenyl)methane triglycidyl ether. In some examples, the epoxy-based cross-linker is selected from 3,4-epoxycyclohexylmethyl 3,4-epoxycyclohexanecarboxylate and 7-oxabicyclo[4.1.0]hept-3-ylmethyl 7-oxabicyclo

[4.1.0]heptane-3-carboxylate, in some examples, 7-oxabicyclo[4.1.0]hept-3-ylmethyl 7-oxabicyclo[4.1.0]heptane-3-carboxylate.

In some examples, the cross-linker is an aziridine-based cross-linker, for example a polyaziridine. The term "polyaziridine" is used herein to refer to a molecule comprising at least two aziridine groups, e.g. of the formula —N(CH$_2$CR$^2$H), wherein R$^2$ is selected from H and alkyl (e.g. methyl), in some examples, wherein R$^2$ is methyl.

In some examples, the aziridine-based cross-linker is of the formula (II).

$$(S)\text{-}(T\text{-}[W\text{---}V]_i)_k$$

wherein, in each (T-[W—V]$_i$), T, W and V are each independently selected, such that V is an aziridine group, e.g. of the formula —N(CH$_2$CR$^2$H), wherein R$^2$ is selected from H and alkyl;

W is alkylene;

T is selected from a single bond, —O—, —C(=O)—O—, —O—C(=O)— and i is 1 or (ii) Y is NH$_{2\text{-}i}$, wherein i is 1 or 2;

k is at least 1, in some examples, at least 2, in some examples, at least 3, in some examples, 1-4, in some examples, 2-4;

and S is an organic group.

In some examples, the cross-linker of formula (II) has at least two V groups, in some examples, at least three V groups.

In some examples, V is an aziridine of the formula —N(CH$_2$CR$^2$H) in which R$^2$ is alkyl, in some examples, R$^2$ is methyl.

S may comprise or be an organic group selected from optionally substituted alkylene, optionally substituted alkyl, optionally substituted aryl, optionally substituted arylalkyl, optionally substituted alkylaryl, isocyanurate, and a polysiloxane. S may comprise a polymeric component; in some examples, the polymeric components may be selected from a polysiloxane (such as poly(dimethyl siloxane), a polyalkylene (such as polyethylene or polypropylene), an acrylate (such as methyl acrylate) and a poly(alkylene glycol) (such as poly(ethylene glycol) and poly(propylene glycol)), and combinations thereof. In some examples, S comprises a polymeric backbone, comprising a plurality of repeating units, each of which is covalently bonded to (T[W—V]$_i$), with T, W, V and i as described herein. S may be selected from a group selected from a branched or straight-chain C$_{1-12}$ alkyl (e.g. C$_{1-6}$).

In some examples, S is a branched-chain alkyl (e.g. trimethyl propane) in which each of the alkyl branch groups (e.g. each of the methyl groups when S is trimethyl propane) are substituted with a (T[W—V]$_i$) group (i.e. k is 3 when S is trimethyl propane), in which T is selected from —O—, —C(=O)—O—, —O—C(=O)—, in some examples, —O—C(=O)—; i is 1; W is C$_{1-4}$ alkylene, in some examples, methylene (—CH$_2$—) or ethylene (—CH$_2$—CH$_2$—), in some examples, ethylene; and V is an aziridine group of the formula —N(CH$_2$CR$^2$H) in which R$^2$ is alkyl, in some examples, methyl.

In some examples the aziridine-based cross-linker is trimethylolpropane tris(2-methyl-1-azridinepropionate) (XAMA®-2).

In some examples, the cross-linker is an isocyanate-based cross-linker, for example, a polyisocyanate. The term "polyisocyanate" is used herein to refer to a molecule comprising at least two isocyanate groups, e.g. of the formula —NCO.

In some examples, the isocyanate based cross-linker is selected from polymethylene diphenyl isocyanates, biuret, hexamethylene diisocyanate trimer (trimer of HDI), isocyanurated hexamethylene diisocyanate, uretdion dimer (Alipa), blocked isocyanates (Cytec, Bayer, Alipa), and aliphatic polyisocyanates.

In some examples, the isocyanate based cross-linker is selected from polymethylene diphenyl isocyanates (e.g. Papi27 (Dow), Desmodur44V20 (Bayer), Suprasec5024 (Huntsman)), biuret, hexamethylene diisocyanate trimer (trimer of HDI), isocyanurated hexamethylene diisocyanate, uretdion dimer (Alipa), blocked isocyanates (Cytec, Bayer, Alipa), aliphatic polyisocyanates, tolylene diisocyanate, diphenylmethane diisocyanate, naphthalene diisocyanate, xylylene diisocyanate, hydrogenated xylylene diisocyanate, hexamethylene diisocyanate, trimethylhexamethylene diisocyanate, isophorone diisocyanate, methylene-bis(4-cyclohexyl isocyanate),

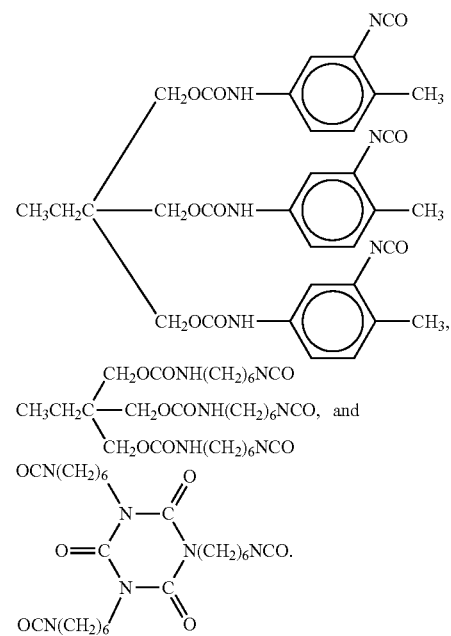

In some examples, the cross-linker is an emulsifier-modified polyisocyanate. In some examples, the cross-linker is an emulsifier-modified polyisocyanate based on isocyanurated hexamethylene diisocyanate. An example of an emulsifier-modified polyisocyanate is Basonate 9056®.

In some examples, the cross-linker is a carbodiimide-based cross-linker, for example, a polycarbodiimide. The term "polycarbodiimide" is used herein to refer to a molecule comprising at least two carbodiimide groups, e.g. of the formula —NCN—.

In some examples, the carbodiimide-based cross-linker is SV-02 Carbodilite.

In some examples, the cross-linker is selected from organic metallic complexes or ions, for example, ionomers and Zn$^{2+}$, Ca$^{2+}$ containing compounds.

In some examples, the cross-linker comprises a maleic anhydride, e.g. the cross-linker may be a maleic anhydride-based cross-linker. In some examples, the cross-linker is a polymaleic anhydride.

In some examples, the maleic anhydride-based cross-linker is of formula (III),

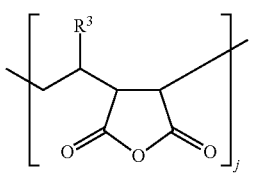

where $R^3$ is H or alkyl and j is 1 or more.

In some examples, j is greater than 1, in some examples, 10 or more, in some examples, 100 or more.

In some examples, $R^3$ is H or $C_{1-20}$ alkyl (e.g. $C_{16}$ alkyl).

In some examples, the maleic anhydride-based cross-linker is polymaleic anhydride 1-octadecene (available from Polyscience), poly(ethylene-alt-maleic anhydride) (available from Sigma).

In some examples, the cross-linker comprises an anhydride. In some examples, the cross-linker is an anhydride based cross-linker, e.g. a cross-linker comprising the group —C(O)OC(O)—.

In some examples, the anhydride based cross-linker is a cyclic anhydride, in some examples a cyclic anhydride of formula (IV)

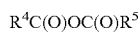

$$R^4C(O)OC(O)R^5$$

where $R^4$ and $R^5$ are linked to form an optionally substituted ring.

In some examples, the anhydride based cross-linker is glutaric anhydride or phthalic anhydride.

In some examples, the cross-linker comprises a polyanhydride, for example, polyacrylic anhydride or polymethacrylic anhydride.

In some examples, the cross-linker comprises an aldehyde. In some examples, the cross-linker is an aldehyde-based cross-linker, for example, a polyaldehyde. The term "polyaldehyde" is used herein to refer to a molecule comprising at least two aldehyde groups, e.g. of the formula —C(O)H.

In some examples, the cross-linker comprises a ketone. In some examples, the cross-linker is a ketone-based cross-linker, for example, a polyketone. The term "polyketone" is used herein to refer to a molecule comprising at least two ketone groups.

In some examples, the cross-linker comprises an acetyl acetonate. In some examples, the cross-linker is an acetyl acetonate based cross-linker, for example, acetoacetoxyethyl methacrylate (Eastman™ AAEM).

In some examples, the cross-linker comprises an organosilane, for example, a cross-linker comprising a silane group. In some examples, the organosilane may be of the formula $R'Si(R^6)(R^7)(R^8)$ wherein $R^6$, $R^7$ and $R^8$ are independently selected from optionally substituted alkoxy, optionally substituted alkyl and optionally substituted aryl; and R' is selected from optionally substituted alkoxy, optionally substituted alkyl (e.g. aminoalkyl) and optionally substituted aryl. In some examples, $R^6$, $R^7$ and $R^8$ are all alkyl, e.g. methyl. In some examples, R' is optionally substituted alkyl, e.g. amino substituted alkyl (e.g. $C_{1-12}$ aminoalkyl), or isocyanate substituted alkyl. In some examples, R' is $C_{1-6}$ aminoalkyl (e.g. aminopropyl).

In some examples, the cross-linker comprises trimethylaminopropylsilane.

In some examples, the cross-linker comprises an epoxyorganosilane, for example, a cross-linker comprising a silane group (e.g. a group of formula —$Si(R^6)(R^7)(R^8)$ as described above) and an epoxy group as described above.

In some examples, the cross-linker comprises an epoxyorganosilane selected from epoxypropyltrimethoxysilane and oligomeric polyepoxysilane.

Flexible Film

The printed rigid plastic substrate may comprise a flexible film. In some examples, the flexible film comprises a thin film. In some examples, the flexible film comprises a flexible plastic film. In some examples, the flexible film may be referred to as an overlay. In some examples, the flexible film is transparent in order that the printed layer is visible through the flexible film. In some examples the flexible film is more flexible than the rigid plastic substrate. In some examples, the flexible film is deformable under light to moderate stress or strain, and does not maintain a rigid form in the absence of stress or strain.

In some examples, the flexible film comprises a film of a polymer, for example, a thermoplastic polymer.

The flexible film may comprise a synthetic polymeric material, for example, a polymer formed from alkylene monomers, including, for example, polyethylene and polypropylene, and co-polymers such as styrene-polybutadiene and polyvinyl chloride. The polypropylene may, in some examples, be biaxially orientated polypropylene.

In some examples, the flexible film is of the same material as the rigid plastic substrate on which it is to be overlaid. Thus, the flexible film may comprise a material as defined above in connection with the rigid plastic substrate, for example a material selected from polyvinyl chloride, polyvinyl chloride acetate, polycarbonate, and polyester.

In some examples, the flexible film comprises a thin film, wherein the film has a thickness of 150 μm or less, in some examples, 140 μm or less, in some examples, 130 μm or less, in some examples, 120 μm or less, in some examples, 110 μm or less, in some examples, 100 μm or less, in some examples, 90 μm or less, in some examples, 80 μm or less, in some examples, 70 μm or less, in some examples, about 60 μm or less, in some examples, 50 μm or less, in some examples, 40 μm or less, in some examples, 30 μm or less, in some examples, 20 μm or less, in some examples, about 10 μm. In some example, the flexible film comprises a thin film, wherein the film has a thickness of 10 μm or more, in some examples, 20 μm or more, in some examples, 30 μm or more, in some examples, 40 μm or more, in some examples, 50 μm or more, in some examples, 60 μm or more, in some examples, 70 μm or more, in some examples, 80 μm or more, in some examples, 90 μm or more, in some examples, 100 μm or more, in some examples, 110 μm or more, in some examples, 120 μm or more, in some examples, 130 μm or more, in some examples, 140 μm or more, in some examples, about 150 μm. In some examples, the flexible film comprises a thin film, wherein the film has a thickness of about 10 μm to about 150 μm, in some examples, 20 μm to 140 μm, in some examples, 30 μm to 130 μm, in some examples, 40 μm to 120 μm, in some examples, 50 μm to 110 μm, in some examples, 60 μm to 100 μm, in some examples, 60 μm to 90 μm, in some examples, 60 μm to 80 μm, in some examples, 60 μm to 70 μm, in some examples, 70 μm to 80 μm.

In some examples, the flexible film comprises an adhesive on a surface of the flexible film. In some examples, the flexible film, in use, comprises an adhesive on a surface of the flexible film, the adhesive disposed between the cross-linking composition and the flexible film.

In some examples, the adhesive comprises a pressure-sensitive adhesive, a heat sensitive adhesive, a contact adhesive, a drying adhesive (that is, an adhesive that adheres on drying), a radiation-curing adhesive (for example, a UV-curing adhesive) or a moisture-curing adhesive (for example, an adhesive that cures by reacting with moisture present, for example, on the surface of the rigid plastic substrate when the flexible film is applied, or in the air). In some examples, the pressure-sensitive adhesive may be a hot melt pressure sensitive adhesive, such as, for example, a rubber-based or acrylic-based pressure sensitive adhesive. In some examples, the adhesive may be based on a rubber-based hot melt composition, a solvent rubber adhesive, a solvent acrylic adhesive, or a solvent polyurethane adhesive. In some examples, the adhesive may be a polyurethane-based adhesive, a polyamide-based adhesive or an acrylic based adhesive. In some examples, the adhesive may be an emulsion-based adhesive, for example, an acrylic emulsion adhesive.

In some examples, the adhesive is a solvent-based adhesive, a solvent-less adhesive or a water based adhesive. In some examples, the adhesive is a solvent based adhesive, for example, a polyurethane or epoxy based adhesive. In some examples, the adhesive is a solvent-less adhesive, for example, a polyurethane, or UV or electron beam curable adhesive In some examples, the adhesive is a water-based adhesive, for example, an adhesive comprising polyurethane or acrylic resins.

In some examples, the adhesive layer has a thickness of 50 μm or less, in some examples, 40 μm or less, in some examples, 30 μm or less, in some examples, 20 μm or less, in some examples, 15 μm or less, in some examples, 10 μm or less, in some examples, 5 μm or less. In some examples, the adhesive layer has a thickness of 5 μm or more, in some examples, 10 μm or more, in some examples, 15 μm or more, in some examples, 20 μm or more, in some examples, 30 μm or more, in some examples, 40 μm or more, in some examples, 50 μm or more. In some examples, the adhesive layer has a thickness of 5 μm to 50 μm, in some examples, 10 μm to 40 μm, in some examples, 15 μm to 30 μm, in some examples, 15 μm to 20 μm.

Process for Preparing a Printed Rigid Plastic Substrate

Described herein is a process for preparing a printed rigid plastic substrate comprising: providing a rigid plastic substrate comprising a primer on a surface of the rigid plastic substrate, the primer comprising a primer resin; printing a liquid electrophotographic ink composition comprising a thermoplastic resin onto the primer on the surface of the rigid plastic substrate; depositing a cross-linking composition comprising a cross-linker onto the printed electrophotographic ink composition disposed on the primer; and laminating the rigid plastic substrate with a flexible film such that the ink composition and the cross-linker are disposed between the rigid substrate and the flexible film and wherein the lamination of the rigid substrate with the flexible film causes cross-linking of the thermoplastic resin of the ink composition and of the primer resin.

The process described herein is depicted generally in FIG. 1, in which the following reference numerals are used to identify the features indicated: reference numeral "1" denotes a rigid plastic substrate; reference numeral "2" denotes a liquid electrophotographic ink composition; reference numeral "3" denotes a cross-linking composition; reference numeral "4" denotes a flexible film. While these are shown as distinct layers in FIG. 1 for ease of reference, it will of course be understood that the cross linker composition after application will penetrate into the ink and primer layers, rather than remaining as a distinct layer.

FIG. 1 depicts a process in which a rigid plastic substrate (1) is provided, the rigid plastic substrate comprising a primer on a surface of the rigid plastic substrate. A liquid electrophotographic ink composition (2) is printed onto the primer on the surface of the rigid plastic substrate (1). A cross-linking composition (3) comprising a cross-linker is then deposited onto the printed electrophotographic ink composition (2), for example, the printed ink layer (2) disposed on the primer layer disposed on the rigid plastic substrate (1). A flexible film (4) is then provided. The rigid plastic substrate (1) having the printed ink layer (2) and the cross-linking composition (3) disposed thereon is then laminated with the flexible film (4) such that the ink composition (2) and the cross-linking composition (3) are disposed between the rigid plastic substrate (1) and the flexible film (4).

In some examples, the process comprises applying a corona treatment to the printed electrophotographic ink composition before deposition of a cross-linking composition onto the printed electrophotographic ink composition. In some examples, the process comprises applying a corona treatment to the printed electrophotographic ink composition before deposition onto the printed electrophotographic ink composition of an aqueous cross-linking composition.

In some examples, the cross-linking composition may be applied to the printed electrophotographic ink composition disposed on the primer layer by using any suitable coating process. In some examples, the cross-linking composition is deposited onto the printed electrophotographic ink composition by using a flexo coating, gravure, offset, or screen printing process. In some examples, the cross-linking composition is deposited onto the printed electrophotographic ink composition by using a printing machine. In some examples, the cross-linking composition is deposited onto the printed electrophotographic ink composition by using a laminator.

In some examples, depositing a cross-linking composition onto the printed electrophotographic ink composition comprises depositing a cross-linking composition comprising a cross-linker for cross-linking the thermoplastic resin of the electrophotographic ink composition. In some examples, depositing the cross-linking composition onto the printed electrophotographic ink composition comprises depositing a cross-linking composition comprising a cross-linker for cross-linking the thermoplastic resin of the electrophotographic ink composition and for cross-linking the primer resin of the primer. In some examples, depositing the cross-linking composition onto the printed electrophotographic ink composition comprises depositing a cross-linking composition comprising a cross-linker for cross-linking the thermoplastic resin of the electrophotographic ink composition and depositing a cross-linker for cross-linking the primer resin of the primer. In some examples, depositing the cross-linking composition on to the printed electrophotographic ink composition may comprise depositing a cross-linking composition for cross-linking the thermoplastic resin of the printed electrophotographic ink composition and depositing an additional cross-linking composition comprising a cross-linker for cross-linking the primer resin of the primer.

In some examples, the cross-linking composition is deposited on the printed electrophotographic ink composition in an amount such that the coat weight of the cross-linker measured over the area of the surface of the rigid plastic substrate is at least $0.01$ g/m$^2$, in some examples, at least $0.02$ g/m$^2$, in some examples, at least $0.03$ g/m$^2$, in some examples, at least $0.04$ g/m$^2$, in some examples, at least $0.05$ g/m$^2$, in some examples, at least $0.06$ g/m$^2$, in some examples, at least $0.08$ g/m$^2$, in some examples, at least $0.1$ g/m$^2$, in some examples, at least $0.12$ g/m$^2$, in some examples, at least 0.15 g/m², in some examples, at least 0.18 g/m², in some examples, at least about 0.2 g/m², in some examples, at least about 0.3 g/m², in some examples, at least about 0.4 g/m², in some examples, at least 0.5 g/m². In some examples, the cross-linking composition is deposited on the printed electrophotographic ink composition in an amount such that the coat weight of the cross-linker measured over the area of the surface of the rigid plastic substrate is up to about 0.4 g/m², in some examples, up to about 0.8 g/m², in some examples, up to about 1 g/m². In some examples, the cross-linking composition is deposited on the printed electrophotographic ink composition in an amount such that the coat weight of the cross-linker measured over the area of the surface of the rigid plastic substrate is from about 0.04 to about 0.8 g/m², in some examples, from about 0.04 to about 0.4 g/m², in some examples from about 0.04 to about 0.2 g/m². In some examples, the cross-linking composition comprises a cross-linker and a carrier solvent and, after depositing the cross-linking composition, the carrier solvent is removed before the lamination of the flexible film to the rigid plastic substrate. In some examples, the carrier solvent is removed by evaporation. In some examples, the carrier solvent is removed by air drying or by heating.

In some examples, laminating the rigid plastic substrate with a flexible film such that the ink composition and the cross-linker are disposed between the rigid substrate and the flexible film causes cross-linking of the thermoplastic resin of the ink composition and of the primer resin. In some examples, laminating the rigid plastic substrate with a flexible film such that the ink composition and the cross-linker are disposed between the rigid substrate and the flexible film causes the activation of the cross-linking composition.

In some examples, the activation of the cross-linking composition during the lamination results in the formation of a cross-linked thermoplastic resin. In some examples, the activation of the cross-linking composition during the lamination results in the formation of a cross-linked thermoplastic resin and the cross-linking of the thermoplastic resin and the primer resin. In some examples, the activation of the cross-linking composition during the lamination results in the formation of a cross-linked thermoplastic resin and of a cross-linked primer resin. In some examples, the activation of the cross-linking composition during the lamination results in the formation of a cross-linked thermoplastic resin, the cross-linking of the thermoplastic resin and the primer resin and a cross-linked primer resin.

In some examples, laminating the rigid plastic substrate with the flexible film comprises applying an adhesive, for example, a solvent-based adhesive, to a surface of the rigid plastic substrate printed with the ink composition and coated with a cross-linking composition, and then contacting the flexible film with the adhesive disposed on the cross-linking composition. In some examples, laminating the rigid plastic substrate with the flexible film comprises applying a flexible film comprising an adhesive disposed on the flexible film such that the adhesive contacts the printed surface of the substrate.

In some examples, laminating the rigid plastic substrate with the flexible film comprises heating and/or applying pressure to the rigid plastic substrate and the flexible film.

In some examples, lamination may be carried out on any apparatus suitable for performing lamination. In some examples, the laminating apparatus on which the lamination may be carried out may comprise nip rollers. Lamination carried out with a nip roller(s) may be carried out at a pressure suitable to adhere the flexible film with the ink composition and cross-linking composition and primer disposed on the rigid plastic substrate and thereby create a bond between the materials. Lamination carried out with a nip roller(s) may be carried out at a pressure and temperature suitable to adhere the flexible film with the ink composition and cross-linking composition and primer disposed on the rigid plastic substrate and thereby create a bond between the materials. Lamination carried out with a nip roller(s) may be carried out at a pressure suitable cause cross-linking of the cross-linker and to adhere the flexible film with the ink composition and cross-linking composition and primer disposed on the rigid plastic substrate and thereby create a bond between the materials. Lamination carried out with a nip roller(s) may be carried out at a pressure and temperature suitable to cause cross-linking of the cross-linker and to adhere the flexible film with the ink composition and cross-linking composition and primer disposed on the rigid plastic substrate and thereby create a bond between the materials.

In some examples, the lamination is performed by a press laminator.

In some examples, the pressure for lamination or the laminating nip may be 200 bar or less, for example, 175 bar or less, for example, 150 bar or less, for example, 120 bar or less, for example, 110 bar or less, for example, 100 bar or less, for example, 75 bar or less, for example, 50 bar or less, for example, 25 bar or less, for example, 20 bar or less, for example, 10 bar or less, for example, about 9 bar or less, for example, about 8 bar or less, for example, about 7 bar or less, for example, about 6 bar or less, for example, about 5 bar or less, for example, about 4 bar or less, for example, about 3 bar or less, for example, about 2 bar.

In some examples, the pressure for lamination or the laminating nip may be about 2 bar or more, for example, about 3 bar or more, for example, about 4 bar or more, for example, about 5 bar or more, for example, about 6 bar or more, for example, about 7 bar or more, for example, about 8 bar or more, for example, about 9 bar or more, for example, about 10 bar or more, for example, about 20 bar or more, for example, about 25 bar or more, for example, about 50 bar or more, example, about 75 bar or more, for example, about 100 bar or more, for example, about 110 bar or more, for example, about 120 bar or more, for example, about 150 bar or more, or more, for example, about 175 bar or more, for example about 200 bar.

In some examples, lamination is carried out at a temperature of at least about 80° C., in some examples, at least about 90° C., in some examples, at least about 100° C., in some examples, at least about 150° C., in some examples, at least about 160° C., in some examples, at least about 170° C., in some examples, at least about 180° C., in some examples, at least about 200° C., in some examples, at least about 210° C., in some examples, at least about 220° C., in some examples, at least about 240° C., in some examples, at least about 250° C. In some examples, lamination is carried out at a temperature of up to about 250° C., in some examples, up to about 220° C., in some examples, up to about 210° C., in some examples, up to about 200° C., in some examples, up to about 180° C., in some examples, up to about 170° C., in some examples, up to about 160° C. in some examples, up to about 150° C., in some examples, up to about 100° C., in some examples, up to about 80° C. In some examples, lamination is carried out at a temperature in the range of about 80° C. to 350° C., in some examples, 100° C. to 200° C., in some examples, 120° C. to 200° C., in some examples, 80° C. to 140° C., in some examples, 90° C. to 130° C., in some examples, 100° C. to 130° C., in some examples, 110° C. to 120° C.

In some examples, the rigid plastic substrate comprises a primer on both surfaces of the rigid plastic substrate. In some examples, a liquid electrophotographic ink composition is printed on each surface of the rigid plastic substrate. In some examples, a cross-linking composition is deposited on each surface of the rigid plastic substrate. In some examples, a flexible film is laminated to each surface of the rigid plastic substrate.

In some examples, two rigid plastic substrates onto which cross-linking compositions have been deposited are placed back to back such that the cross-linking compositions form the external surfaces of the combined rigid plastic substrates and a flexible film is laminated to each external surface with fusion of the two rigid plastic substrates to each other, as well as activation of the cross-linker.

Examples

The following illustrates examples of the materials, methods and related aspects described herein. Thus, these examples should not be considered to restrict the present disclosure, but are merely in place to teach how to make examples of compositions of the present disclosure. As such, a representative number of compositions and their method of manufacture are disclosed herein.

General Process

A rigid plastic substrate comprising a primer on a surface of the rigid plastic substrate was prepared by providing a polyvinyl chloride sheet (PVC Pentacard®; M230 from Klockner). A primer comprising a primer resin (Michelman DigiPrime 060) was applied to the rigid plastic substrate using the in-line priming system in an HP Indigo 30000 digital press (containing a 1.8 BCM anilox roller; using a drying temperature of 80° C., a dryer air flow rate of 70 m/sec and a sheet speed of 1.55 m/sec), forming a rigid plastic substrate comprising a primer on a surface of the rigid plastic substrate.

An image was liquid electrostatically printed onto the primer on the surface of the rigid plastic substrate using an HP Indigo 30000 printing press (in one-shot mode) and yellow, black, cyan, magenta, green, orange, white and/or violet inks from the HP ElectroInk® 4.5 range (available from HP Indigo), that is, liquid electrostatic ink compositions comprising a thermoplastic resin comprising ethylene acrylic acid, ethylene methacrylic acid copolymers with a varied ink coverage of between 50% and 400%.

A cross-linking composition comprising a cross-linker was then deposited onto the image using either wire draw down coating (using RDS 1.5) or flexographic coating (using an AB Graphics Digicoat machine with an anilox 400*20 (4BCM, 6.24 cm$^3$/m$^2$) roller and an application roller at a speed of 9-11 m/min). The cross-linking composition was then dried at under low heat flux (either under high air flow and high temperature for a short period of time or at low temperature for a longer period of time) to evaporate the solvent (water or ethyl acetate) without causing deformation of the PVC substrate.

A flexible film was laminated onto the rigid plastic substrate by using a press laminator (Burkle LAT 4.5 lab press laminator) at a temperature of 110° C. or 120° C. and a pressure of 3.5 bar for 10 minutes and then cooled with chilled water to approximately 40° C. under a pressure of 5.7 bar to produce a printed rigid plastic substrate. The laminating conditions cause the cross-linking of the thermoplastic resin of the ink composition and of the primer resin.

Cross-Linking Compositions

The following cross-linking compositions were used: Basonate 9056 (B 9056; an emulsifier-modified polyisocyanate based on isocyanurated hexamethylene diisocyanate) as a 3 wt. % or a 5 wt. % solution in water.

Lambson Indigicot S105 (L S105; 7-oxabicyclo[4.1.0]hept-3-ylmethyl 7-oxabicyclo[4.1.0]heptane-3-carboxylate) as a 5 wt. % solution in ethyl acetate.

Drying Methods

Cross-linking compositions in which water was used as the solvent were initially dried in the AB gRaphics Digicoat machine at a machine speed of 9-11 m/min, air flow rate of about 30 m/min and a temperature of 70° C. before being placed in an oven at 40° C. (no air flow) for 10 min.

Cross-linking compositions in which ethyl acetate was used as the solvent were dried by being placed in an oven at 40° C. (no air flow) for 19 h.

Flexible Films

Bilcare Coated SICOPLAST 167_B 0073 U1L1 overlay (U1L1) comprises a 50 μm thick flexible polyvinyl chloride film coated with a polyamide adhesive.

Tianjin Boyuan B5116T-OT (Boyuan) comprises a 60 and 80 μm thick flexible polyvinyl chloride film coated with a polyurethane adhesive.

Klockner Pentacard Rigid Vinyl Overlay CC-L279/01 SB6 (SB6) comprises a 60 μm thick flexible polyvinyl chloride film coated with a polyamide adhesive.

Klockner Pentacard Rigid Vinyl PVC CC-L279/01 140 (H140) comprises a 60 μm thick flexible polyvinyl chloride film coated with a polyurethane adhesive.

Alchemy Alocaote DPH1 overlay (DPH1) comprises a 60 μm thick flexible polyvinyl chloride film coated with an acrylic adhesive.

Tianjin Gsight HP Indigo PVC coated overlay (Gsight) comprises a 60 μm thick flexible polyvinyl chloride film coated with a polyurethane adhesive.

Lamination Bond Strength Tests

To quantify the adhesion of the flexible film to the rigid plastic substrate, the force required to de-laminate the flexible film from the rigid plastic substrate was measured and is referred to herein as the lamination bond strength. The lamination bond strength was determined by using the peel strength test procedure according to ISO 10373-1.

First the printed rigid plastic substrates were cut to produce 1 inch wide test specimen. Using a sharp knife, a 10 mm (0.4 in) section of the flexible film layer was delaminated from the rigid plastic substrate and fixed at a 90° angle to the rigid plastic substrate. The prepared test specimen was mounted in an LLOYD materials testing AMETEK LS5 tensile testing machine. The force required to de-laminate the flexible film from the rigid plastic substrate was measured using a preloading force of 0.5 N and a test speed of 300 mm/min, with the limit of the measurement being 20 mm from the edge of the 1 inch wide test specimen.

Figure 2:
FIG. 2 shows the results of the lamination bond strength tests described herein.

The results are provided in Table 1 below and are also shown in the bar chart in FIG. 2, in which Ref. indicates that no cross-linker was used. As can be seen in the data presented, use of a cross-linker composition increases the average lamination bond strength, depending on the nature of the cross-linker and flexible film.

For comparison, the lamination bond strength required for security cards is a minimum of 5.5 N/inch (2.17 N/cm) while other card applications require a minimum of 3.5 N/inch (1.78 N/cm).

TABLE 1

| Flexible Film | Cross-linker | Average Lamination Bond Strength [N/inch] | | | |
|---|---|---|---|---|---|
| | | 50% colour | 100% colour | 200% colour | 350-400% colour |
| Boyuan | None | 19.21 | 24.15 | 20.76 | 25.80 |
| | 5% B 9056 | 35.28 | 26.89 | 28.23 | 27.50 |
| | 3% B 9056 | | 27.34 | | |
| | 5% L S105 | 30.13 | 24.47 | 22.83 | 25.11 |
| H140 | None | 30.7 | 28.2 | 23.0 | 15.9 |
| | 5% B 9056 | 31.80 | 30.70 | 42.80 | 26.27 |
| SB6 | None | 21.60 | 4.09 | 3.48 | 7.81 |
| | 5% B 9056 | 22.97 | 14.99 | 12.26 | 9.05 |
| | 3% B 9056 | | 11.60 | | 7.80 |
| | 5% L S105 | 27.68 | 2.30 | 5.35 | 3.97 |
| U1L1 | None | 2.19 | 1.50 | 6.30 | 13.32 |
| | 5% B 9056 | 23.78 | 24.38 | 29.09 | 21.33 |
| | 5% L S105 | 5.60 | 7.96 | 12.84 | 7.70 |

Print quality of each laminated substrate was inspected visually. Use of the cross-linking agent with each overlay/flexible film reduced ink distortion/improved print image quality relative to the overlay laminated in the absence of the cross-linking agent.

While the process for preparing a printed rigid plastic substrate and the printed rigid plastic substrate have been described with reference to certain examples, it will be appreciated that various modifications, changes, omissions, and substitutions can be made without departing from the spirit of the disclosure. It is intended, therefore, that the process and the printed rigid plastic substrate be limited by the scope of the following claims. The features of any dependent claim can be combined with the features of any of the other dependent claims, and any other independent claim.

What is claimed is:

1. A process for preparing a printed rigid plastic substrate comprising:
   providing a rigid plastic substrate with a tensile strength of at least 20 N/mm$^2$, the rigid plastic substrate comprising a primer on a surface of the rigid plastic substrate, the primer comprising a primer resin, the primer resin comprising a carboxylic functional group, an amine functional group, or a polyol functional group;
   printing a liquid electrophotographic ink composition comprising a thermoplastic resin onto the primer on the surface of the rigid plastic substrate, the thermoplastic resin comprising a copolymer with a carboxylic functional group, an amine functional group, or a polyol functional group;
   depositing a cross-linking composition comprising a cross-linker onto the printed electrophotographic ink composition disposed on the primer, the cross-linker being reactive towards a carboxylic functional group, an amine functional group, a polyol functional group, or a combination thereof; and
   laminating the rigid plastic substrate with a flexible film such that the ink composition and the cross-linker are disposed between the rigid plastic substrate and the flexible film, and wherein the lamination of the rigid plastic substrate with the flexible film causes cross-linking of the thermoplastic resin of the ink composition , causes cross-linking of the primer resin, and causes cross-linking between the thermoplastic resin and the primer resin.

2. The process according to claim 1, wherein the rigid plastic substrate comprises a rigid plastic selected from polyvinyl chloride, polyvinyl chloride acetate, polycarbonate, and polyester.

3. The process according to claim 1, wherein the rigid plastic substrate comprises polyvinyl chloride, and wherein the cross-linking composition penetrates into the electrophotographic ink composition and the primer after deposition.

4. The process according to claim 1, wherein the rigid plastic substrate maintains its form in the absence of stress and strain, wherein the primer resin is selected from the group consisting of: a polyvinyl alcohol resin, cellulose based resins, a polyester, a polyamine, a polyethylene imine resin, polyamide resin, polyurethane, copolymers of an alkylene monomer and an acrylic or methacrylic acid monomer, and polyacrylic polymer.

5. The process according to claim 4, wherein the thermoplastic resin comprises a copolymer of an alkylene monomer and a monomer selected form acrylic acid and methacrylic acid, and the cross-linker is selected from an epoxide, an aziridine, an isocyanate, a maleic anhydride, an organic metallic complex or ion, an organosilane, an epoxy organosilane, a carbodiimide, an aldehyde, a ketone, an acetyl acetonate, and combinations thereof.

6. The process according to claim 4, wherein the cross-linking composition comprises an emulsifier-modified polyisocyanate-based cross-linker or a polycarbodiimide-based cross-linker.

7. The process according to claim 1, wherein the cross-linking composition comprises 10 wt. % or less cross-linker.

8. The process according to claim 1, wherein the cross-linking composition comprises 2 wt. % or more cross-linker.

9. The process according to claim 1, wherein the cross-linking composition comprises a carrier solvent, wherein the process further comprises removing the carrier solvent prior to laminating the rigid plastic substrate with the flexible film, and wherein the cross-linking composition comprises the cross-linker in an amount within the range of about 10 wt. % to about 20 wt. % by total weight of the cross-linking composition.

10. The process according to claim 9, wherein the carrier solvent is removed via evaporation prior to lamination.

11. The process according to claim 1, wherein the printed rigid plastic substrate has a thickness of 2000 μm or less.

12. The process according to claim 1, wherein the flexible film is about 60 μm to 80 μm thick, and wherein laminating the rigid plastic substrate with the flexible film, with the ink composition and the cross-linker disposed between the rigid plastic substrate and the flexible film, increases a lamination bond strength and reduces ink distortion as compared to laminating in an absence of the cross-linker.

13. The process according to claim 1, wherein the flexible film comprises an adhesive on a surface of the flexible film, wherein the adhesive contacts the printed surface of the rigid plastic substrate.

14. The process according to claim 13, wherein the adhesive comprises a polyurethane-based adhesive, a polyamide-based adhesive or an acrylic based adhesive.

15. The process according to claim 1, wherein the cross-linking composition is deposited onto the printed electrophotographic ink composition in an amount such that a coat weight of the cross-linker measured over a surface of the rigid plastic substrate is between about 0.01 g/m$^2$ and about 1 g/m$^2$.

16. The process according to claim 1, wherein laminating the rigid plastic substrate with the flexible film activates the cross-linking composition and causes the cross-linking of the thermoplastic resin of the ink composition, causes the cross-linking of the primer resin, and causes cross-linking between the thermoplastic resin of the ink composition and the primer resin, and wherein the cross-linker comprises a group selected from: epoxy, aziridine, isocyanate, and carbodiimide.

17. The process according to claim 1, wherein the cross-linking composition comprises the cross-linker and a carrier solvent, and the process further comprises removing the carrier solvent prior to laminating the rigid plastic substrate with the flexible film via evaporation.

18. The process according to claim 17, wherein laminating the rigid plastic substrate with the flexible film comprises:
  applying an adhesive to a surface of the rigid plastic substrate printed with the ink composition and coated with the cross-linking composition, with the carrier solvent removed;
  contacting the flexible film with the adhesive; and
  applying at least one of pressure and heat to the rigid plastic substrate and the flexible film to laminate the rigid plastic substrate with the flexible film, and to activate the cross-linking.

19. The process according to claim 18, wherein applying the at least one of pressure and heat includes at least one of:
  applying between about 2 bar and about 200 bar of pressure; and
  applying between about 80 degrees Celsius and about 350 degrees Celsius.

* * * * *